United States Patent [19]
Loomer

[11] Patent Number: 5,501,315
[45] Date of Patent: Mar. 26, 1996

[54] UNSCRAMBLING CONVEYOR

[75] Inventor: Weston R. Loomer, Walton, Ky.

[73] Assignee: Western Atlas Inc., Hebron, Ky.

[21] Appl. No.: 376,197

[22] Filed: Jan. 20, 1995

Related U.S. Application Data

[62] Division of Ser. No. 135,598, Oct. 13, 1993, Pat. No. 5,400,896.

[51] Int. Cl.$^6$ ................................................. B65G 47/12
[52] U.S. Cl. ........................ 198/445; 198/448; 198/786
[58] Field of Search .................................. 198/785, 786, 198/787, 790, 415, 443, 445, 448, 454

[56] References Cited

U.S. PATENT DOCUMENTS

| | | | |
|---|---|---|---|
| 3,552,541 | 1/1971 | Riggs | 198/445 X |
| 4,039,074 | 8/1977 | Naxted | 198/786 X |
| 4,044,897 | 8/1977 | Maxted | 198/448 X |
| 5,240,101 | 8/1993 | Lemay et al. | 198/786 X |

Primary Examiner—D. Glenn Dayoan
Attorney, Agent, or Firm—Brian L. Ribando

[57] ABSTRACT

An unscrambling conveyor includes two side-by-side sets of rollers arranged in a herringbone pattern on either side of a central axis. The rollers of the two sets are positioned at different angles with respect to the axis and the drive speeds for the rollers are chosen to provide equal and opposite forces in the lateral direction and unequal but similarly directed forces in the axial direction. The sets of rollers are divided into zones having progressively increasing roller speeds in the downstream direction with the zones staggered with respect to one another on either side of the central axis. The lateral and axial forces drive articles on the conveyor toward and away from the center axis depending on the roller speeds in the staggered zones and in the downstream direction while imparting a twist to the articles. The successive zones of increasing speed stretch a randomly arranged mass of articles into a single file line. Two unscrambling conveyors may be positioned side-by-side to form a flow splitting-unscrambling conveyor.

13 Claims, 6 Drawing Sheets

UNSCRAMBLING CONVEYOR

This is a divisional of application Ser. No. 08/135,598 filed on Oct. 13, 1993 and now U.S. Pat. No. 5,400,896.

This invention relates to conveyors, and more particularly to power driven roller conveyors used to unscramble randomly arranged cartons by aligning the cartons in a single file and orienting the cartons along their long axis.

BACKGROUND OF THE INVENTION

A variety of unscrambler or singulation type conveyor systems are presently known in the art. Such conveyors generally perform the function of arranging a randomly oriented mass or flow of articles into a single file oriented stream to facilitate processing by downstream conveyors and associated equipment. Typically such conveyors involve the use of rollers which are skewed to effect the forcing of the articles against a side guiding rail as in U.S. Pat. No. 3,866,739. Further, in order to jostle such articles into the desired orientation, the side guiding rail may be provided with an abrasive surface to encourage the rotation and jostling of articles into a single file orientation, as in U.S. Pat. No. 4,039,074. Such side rails may also be formed as offset segments or even randomly adjustable offset segments adjusted so that for some average mix of article configurations the segments provide the desired unscrambling as in U.S. Pat. No. 4,284,186. Such jostling and mixing of cartons takes place over a series of rollers which have segmented drives of increasing velocity to open up the spaces between successive articles and allow articles traveling side by side to be manipulated into single file. Some segmented drives also utilize varying roller velocities oriented to encourage separation of articles and promote movement into the desired single file arrangement as in U.S. Pat. No. 4,039,074 mentioned above.

As such systems are forced to operate at higher speeds and increased throughput capacity certain problems appear with the existing technology. For example, forcing an article to ride along a guide rail which is coated with an abrasive substance can cause the surface of the article to become abraded, and in the case of a carton with printing, an identification label or other information on the exterior, such printing or information will be deteriorated by the abrading action causing a degradation at either the information or the esthetic appearance of the printing or exterior finish of the carton or article. Such abrading also causes a build-up of debris, dust and the like in the area of the unscrambler apparatus which is not desirable. In the case of segmented adjustable guide rails, such rails are purposely arranged to provide a maximum jostling and mixing action to the articles flowing by, and at high speeds, the impact produced by these rails can cause damage to the articles and to the contents thereof. The rails also contribute to the creation of a jam condition by restricting lateral article travel. It would accordingly be desirable to provide an unscrambling conveyor which would decrease the damage to the articles, cartons, surfaces and the contents thereof as they are manipulated by the conveyor into a single file.

SUMMARY AND OBJECTS OF THE INVENTION

An unscrambler conveyor comprises a herringbone pattern of rollers in which the angle of the rollers on one side of the pattern is different than the angle on the other. By proper adjustment of the roller speed, the force vectors produced by the rollers can be made equal and opposite in the lateral direction and unequal but in the same direction in the axial direction. The force vectors will cause an article to be driven to the center of the herringbone pattern and to travel down the axis of the conveyor while twisting about its own axis. Zones of increasing speed in the downstream direction of the conveyor aid in unscrambling a mass of articles into a single file and may cause the formation of gaps between adjacent articles. The zones are staggered to create unequal force vectors in the lateral direction causing articles to move away from the center axis while traveling down the conveyor. In an alternate embodiment, two unscrambler conveyors are placed side by side to form a combined flow splitter-unscrambler conveyor.

It is accordingly an object of the invention to provide an unscrambling conveyor which minimizes the damage to articles, cartons, their surfaces and contents as such items pass through the conveyor.

It is another object of the invention to provide an unscrambling conveyor which will be operable at higher speeds and throughput capacities than known devices.

It is another object of the invention to provide an unscrambling conveyor which provides the required mixing action of articles to achieve the descrambling process without requiring such articles to contact, rub along or be impacted by any fixed guide, surface or obstruction as it passes through the conveyor.

It is another object of the invention to provide an unscrambling conveyor which has an omni-directional mixing action rather than the limited mixing action which can be achieved by present adjustable segmented rails, paddles or other flow disturbing devices.

It is yet another object of the invention to provide an unscrambling conveyor that will urge articles of elongated shape to assume a position where the long axis of the article is parallel to the direction of travel.

DESCRIPTION OF THE PREFERRED EMBODIMENT

Figure 1:
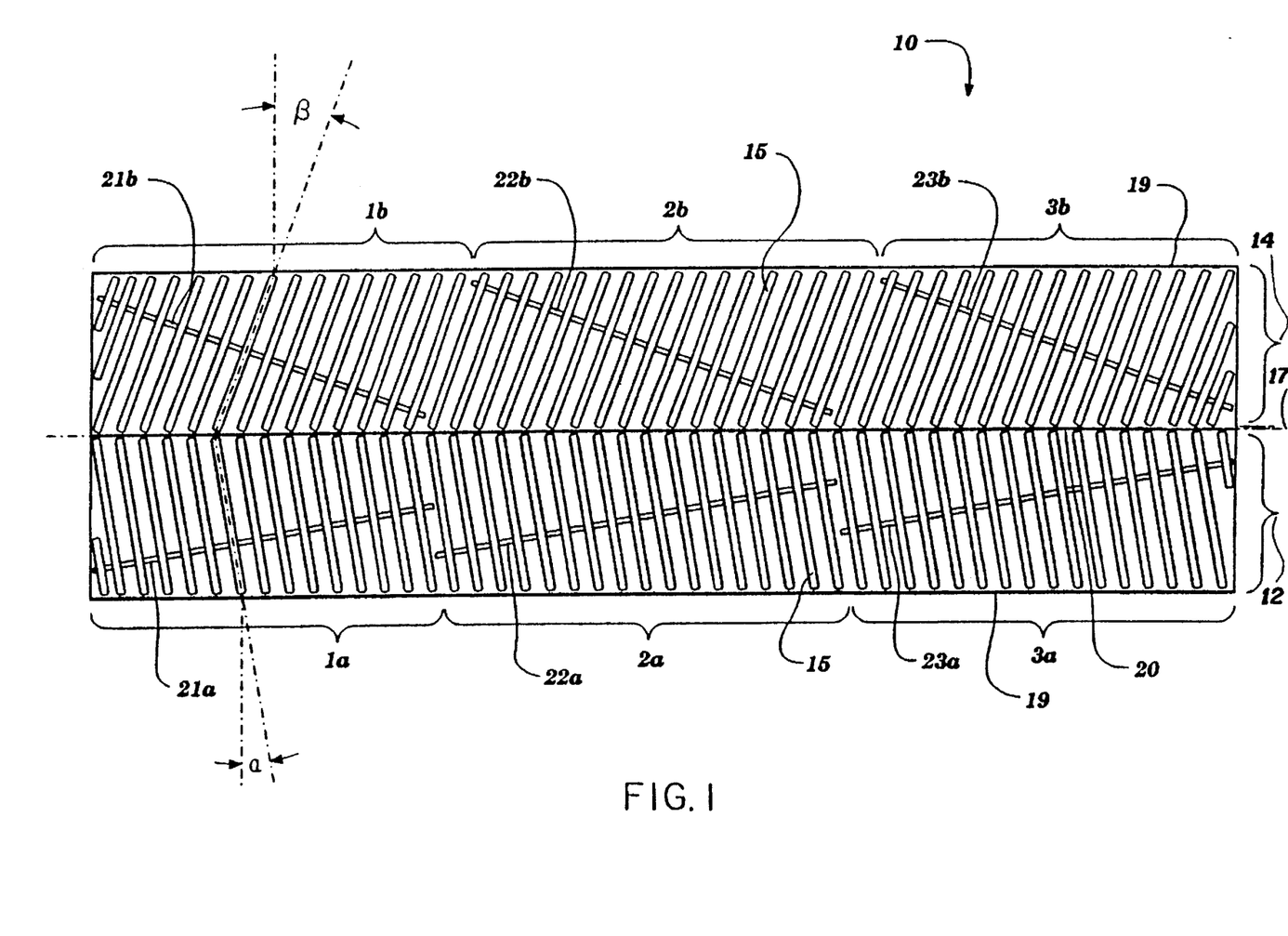
FIG. 1 is a plan view of an unscrambler conveyor according to the invention.

Turning now to the drawing figures there is shown in FIG. 1 an unscrambling conveyor generally designated by the reference numeral 10. The unscrambling conveyor 10 is shown in overhead or plan view and comprises two sets, 12 and 14 of skewed elongated rollers 15 arranged in a herringbone pattern along the length of the conveyor 10. The conveyor is used to transport articles from left to right and the herringbone pattern of the rollers 15 will cause the articles to propagate toward the center axis 17 of the pattern. The skew angle "α" which is formed between the rollers in set 12 and a line which is perpendicular to the center axis 17 is different than the skew angle "β" of the rollers in set 14.

The conveyor also comprises outside frame supports 19 and a center frame support 20 which provide attachment points for the rollers 15 in a manner which is known in the art. Because the conveyor does not rely on abutments positioned along the sides of the conveyor bed to unscramble packages, the outside frame supports do not have to project above the rollers 15 in order to support such abutments. As a result, lateral motion of packages on the conveyor is unrestricted and potential jam conditions are avoided by allowing a package overload to spill over the sides of the conveyor.

Each set of elongated rollers 12 and 14 is divided into zones of progressively increasing velocity. FIG. 1 shows three zones, however in practice the number of zones may be varied in order to achieve the desired result. The rollers in each zone on either side of the center axis 17 are driven by a belt positioned beneath the conveying surface in contact with the rollers in that zone. Belts 21a and 21b are positioned beneath the rollers in zones 1a and 1b, respectively; belts 22a and 22b are positioned beneath the rollers in zones 2a and 2b, respectively; and belts 23a and 23b are positioned beneath the rollers in zones 3a and 3b, respectively. It will be appreciated that instead of belts, the rollers may be driven by chains or gears or may be self powered, as desired, without departing from the spirit of the invention.

Figure 2:
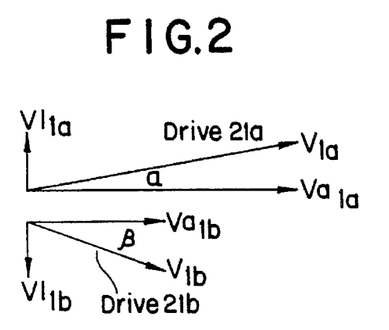
FIGS. 2–4 are vector diagrams showing the forces acting on an article on the unscrambler conveyor of FIG. 1.

The belts in successive zones may be driven at increasing speeds in order to create gaps between articles on the conveyor 10. Those skilled in the art will recognize that the differing skew angles of the roller sets 12 and 14 will cause unequal force vectors on opposite sides of the center axis 17. As shown in FIG. 2, the force vector $V_{1a}$ exerted by the rollers in zone 1a may be resolved into a lateral force $Vl_{1a}$ perpendicular to the center axis 17 and an axial force $Va_{1b}$ parallel to the center axis 17. In a similar manner, the force vector $V_{1b}$ exerted by the rollers in zone 1b may be resolved into a lateral force $Vl_{1b}$ and an axial force $Va_{1b}$. By proper choice of the speeds of the drive belts 21a and 21b, the lateral forces $Vl_{1a}$ and $Vl_{1b}$ may be made equal in magnitude, and, since they are directed in opposite directions, their net effect will be to center an article on the center axis 17 of the conveyor. At the same time, the forces $V_{1a}$ and $V_{1b}$ produce axial forces $Va_{1a}$ and $Vb_{1b}$ which are unequal in magnitude but in the same direction. The net effect of these forces on an article which is straddling the center axis 17, will be to twist or rotate the article around its own axis. As a result, the overall effect of the forces $Vl_{1a}$ and $V_{1b}$ exerted by the rollers in zones 1a and 1b will be to force an article to the center axis 17 and to convey the article along the center axis while twisting the article about its own axis.

Figure 3:
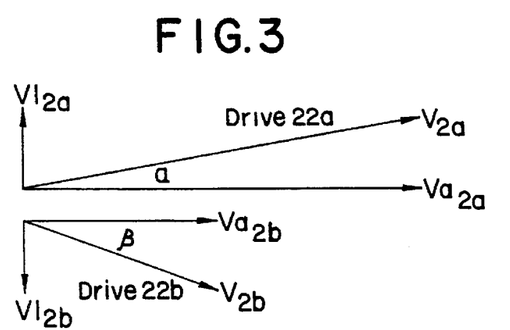

The rollers in successive zones are driven at increasing speeds in order to assist in the unscrambling of the articles into a single line as the articles travel down the conveyor axis. Referring to FIG. 3, the rollers in zone 2a are driven at speed $V_{2a}$ which produces forces $Vl_{2a}$ and $Va_{2a}$. The rollers in zones 2b are driven at speed $V_{2b}$ which produces forces $Vl_{2b}$ and $Va_{2b}$. The speeds $V_{2a}$ and $V_{2b}$ are chosen so that forces $Vl_{2a}$ and $Vl_{2b}$ are equal in magnitude and opposite in direction. The forces $Va_{2a}$ and $Va_{2b}$ are equal in direction and unequal in magnitude. The overall effect of the forces $V_{2a}$ and $V_{2b}$ will be to convey an article along the central axis 17 at a speed which is greater than the speed the article is conveyed in zone 1 while twisting the article about its own axis.

Figure 4:
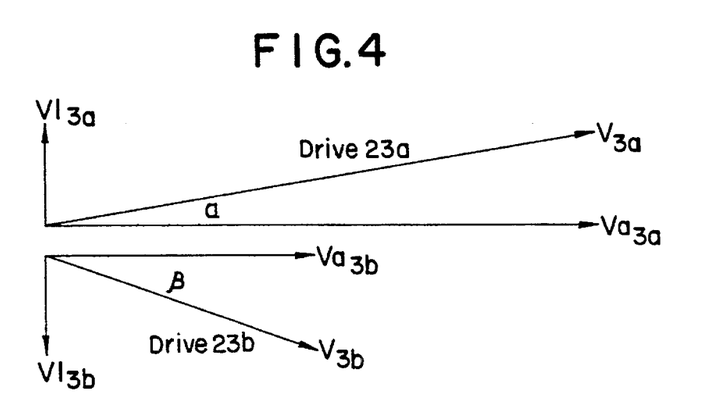

In a similar manner, the rollers in zone 3 are driven at a speed which is greater than the speed of the rollers in zone 2. Referring to FIG. 4, the rollers in zone 3a are driven at speed $V_{3a}$ which produces forces $Vl_{3a}$ and $Va_{3a}$. The rollers in zone 3b are driven at speed $V_{3b}$ which produces forces $Vl_{3b}$ and $Va_{3b}$. The speeds $V_{3a}$ and $V_{3b}$ are chosen so that forces $Vl_{3a}$ and $Vl_{3b}$ are equal in magnitude and opposite in direction. The forces $Va_{3a}$ and $Va_{3b}$ are unequal in magnitude and in the same direction. The overall effect of the forces $V_{3a}$ and $V_{3b}$ will be to convey an article along the central axis 17 at a speed which is greater than the speed at which the article is conveyed in zones 1 and 2 while twisting the article about its own axis.

To fully appreciate the operation of the invention, an understanding of the properties of static friction and dynamic friction is necessary. Static friction or "friction at rest" is greater than Dynamic friction or "friction in motion". An article being conveyed on a surface such as a belt or roller will assume the direction and velocity of the surface on which it is being conveyed unless it is restricted from doing so. When an article is traveling at the same velocity and direction as its supporting conveying surface, the relationship between the article and the surface conveying it is that of Static friction. When an article is traveling in a different direction or at a different velocity than its supporting conveying surface, the relationship between that article and the surface conveying it is that of Dynamic friction. If an article is supported on a conveying surface which is moving in more than one direction or at more than one velocity, or both, it will be in a Static friction relationship with a portion or none of that surface depending upon the relationship of the center of mass of the article to the direction and velocity of the area supporting the majority of the mass of the article. Thus, it can be seen that an article traveling down the center axis 17 of the conveyor 10 in FIG. 1 is supported by conveying surfaces moving in more than one direction, or at more than one velocity, and is generally in a relationship of Dynamic friction with the conveying surface. A first article which is supported entirely by rollers in one zone will be driven at the same velocity as the rollers and is in a Static friction relationship with those rollers. If in traveling at that velocity and in that direction (towards the center axis 17) the first article comes into contact with a second article which is in a Dynamic friction relationship with its conveying surface, the dynamics of the first article in the static relationship will predominate and all other things being equal, the first article will squeeze its way into line displacing the second article until both articles are in an area of Dynamic friction straddling the center axis 17. As a rule, an article on the conveyor will be driven towards the center axis 17 and any article deviating from the center of the conveyor will be urged to return. This area of the conveyor is called the "neutral zone" and in the conveyor shown in FIG. 1, the neutral zone coincides with the center axis 17.

Figure 5:
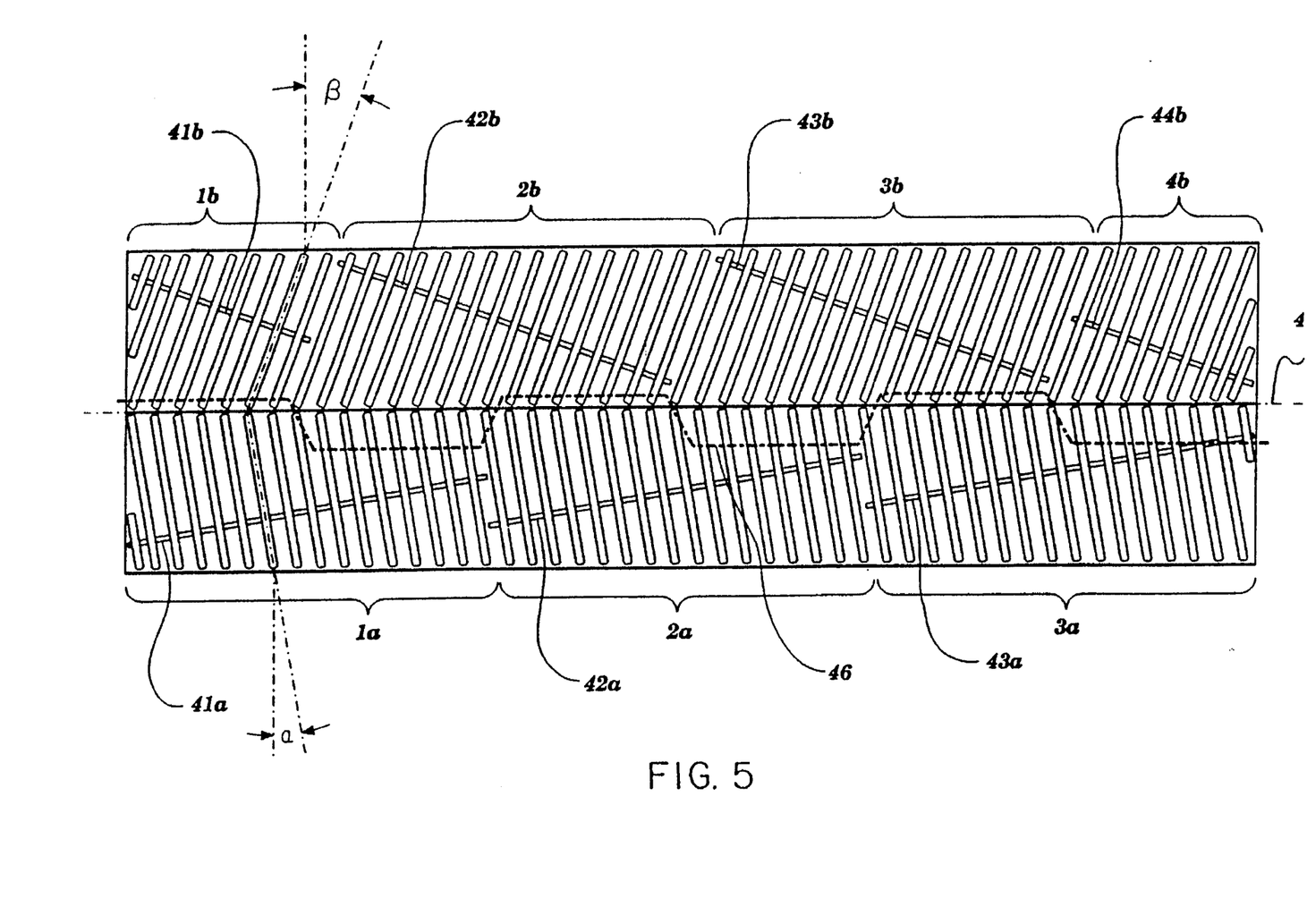
FIG. 5 is an plan view of an alternate embodiment of the unscrambler conveyor of FIG. 1.

FIG. 5 shows a preferred embodiment of the invention in which the driving zones of the conveyor of FIG. 5 on opposite sides of the center axis 40 are offset or staggered with one another. Where a zone of driven rollers on one side of the conveyor overlaps two zones of driven rollers on the opposite side of the conveyor which are driven at different speeds, there is a shift in the relationship of the vectors controlling the motion of the article. As shown in FIG. 5, drive belt 41b in zone 1b is driven slower than drive belt 41a in zone 1a, drive belts 41a and 42b in zones 1a and 2b, respectively, are driven at the same speed, drive belts 42a and 43b in zones 2a and 3b, respectively, are driven at the same speed which is a higher speed than belts 41a and 42b, and drive belts 43a and 44b in zones 3a and 4b, respectively, are driven at the same speed which is a higher speed than belts 42a and 43b. Zone 2b overlaps zones 1a and 2a and zone 3b overlaps zones 2a and 3a.

Figure 6:
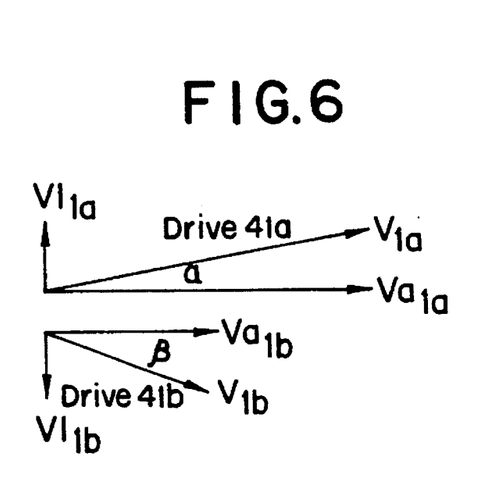
FIGS. 6–10 are vector diagrams showing the forces acting on an article on the unscrambler conveyor of FIG. 5.
Figure 7:
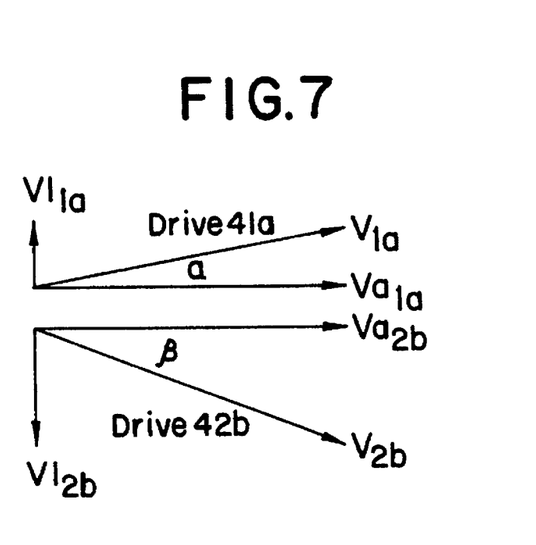
Figure 8:
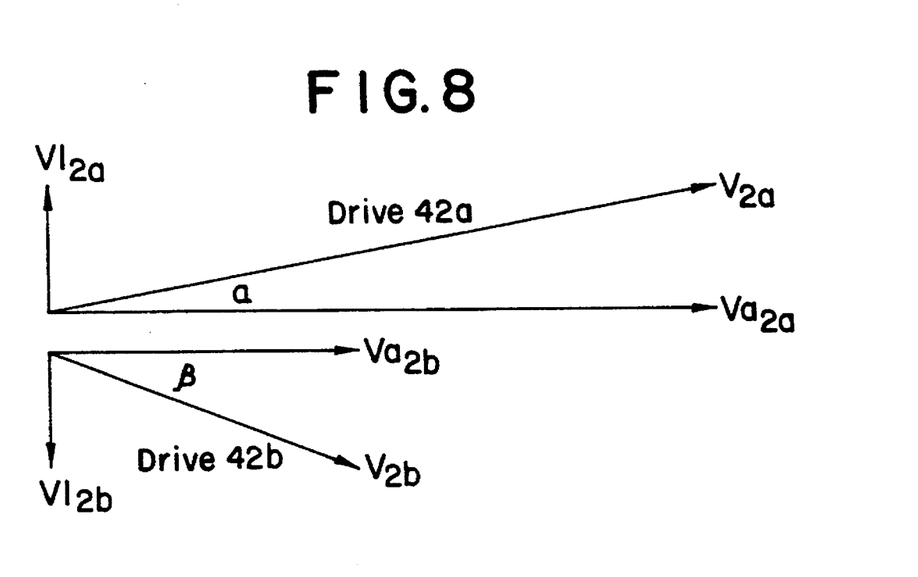

The force vectors for the conveyor in FIG. 5 are shown in FIGS. 6–10. In the region of the conveyor where zones 1a and 1b overlap, the force vectors are shown in FIG. 6. As explained above in connection with FIG. 2, forces $V_{1a}$ and $V_{1b}$ produce lateral forces $Vl_{1a}$ and $Vl_{1b}$ respectively. By proper selection of the magnitude of the forces $V_{1a}$ and $V_{1b}$, $Vl_{1a}$ and $Vl_{1b}$ are equal in magnitude but opposite in direction producing a zero net force in the lateral direction. This creates a neutral zone axis 46 in this region of the conveyor which coincides with the center axis 40. In that region of the conveyor where zone 1a overlaps zone 2b, as shown in FIG. 7, force $V_{1a}$ produces lateral force $Vl_{1a}$ and force $V_{2b}$ produces lateral force $Vl_{2b}$. Force $Vl_{2b}$ is greater than force $Vl_{1a}$ producing a shift in the neutral zone axis 46 onto the rollers which are driven by belt 41a. At the same time, axial forces $Va_{1a}$ and $Vb_{2b}$ are equal, eliminating the twisting forces. In that area of the conveyor where zone 2b overlaps zone 2a as shown in FIG. 8, force $V_{2a}$ produces lateral force $Vl_{2a}$ and force $V_{2b}$ produces lateral force $Vl_{2b}$. Since the lateral forces are equal and in the opposite direction the net lateral force is zero resulting in a shift of the neutral zone axis 46 back to the center axis 40 of the conveyor.

Figure 9:
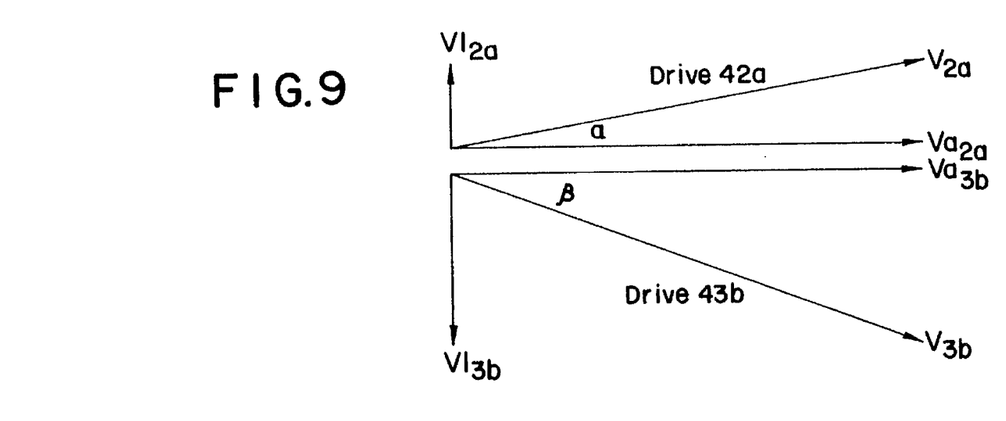
Figure 10:
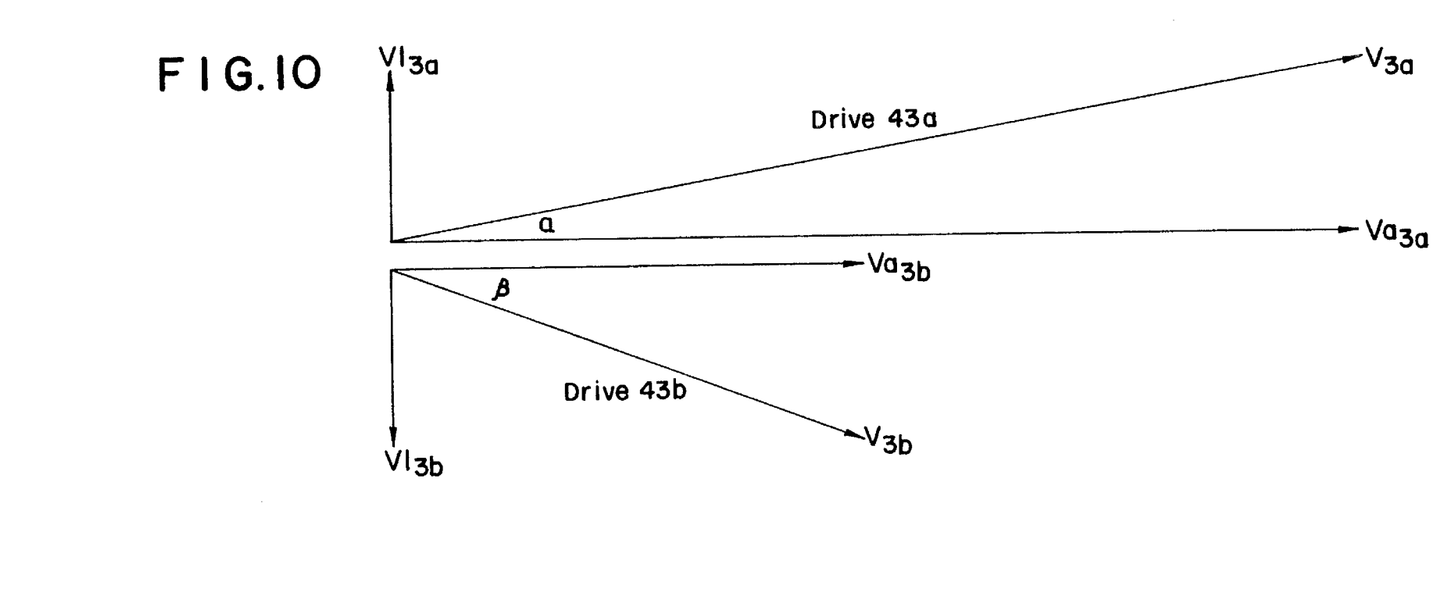

In that region of the conveyor where zone 3b is opposite zone 2a as shown in FIG. 9, force $V_{2a}$ produces lateral force $Vl_{2a}$ and force $V_{3b}$ produces lateral force $Vl_{3b}$. Since lateral force $Vl_{3b}$ is greater than force $Vl_{2a}$, the neutral zone axis 46 shifts from the center axis 40 onto the rollers which are driven by belt 42a, and the twisting forces are eliminated since $Va_{2a}$ and $Va_{3b}$ are equal. In that region of the conveyor where zone 3b is opposite zone 3a as shown in FIG. 10, force $V_{3a}$ produces lateral force $Vl_{3a}$ and force $V_{3b}$ produces lateral force $Vl_{3b}$. The two lateral forces are equal and in opposite directions producing a net lateral force equal to zero. This shifts the neutral zone axis 46 to the central axis 40 of the conveyor. The axial forces $Va_{3a}$ and $Va_{3b}$ are unequal producing a twisting force. Successive regions of the conveyor have similar operating characteristics.

Thus it can be seen that by selecting the proper drive speeds for the various staggered drive sections, a condition is created whereby articles traveling down the conveyor shift laterally in relationship to the center axis 40 to follow the neutral zone axis 46 and will be intermittently urged to rotate or twist while in a state of Dynamic friction with the conveying surface. This motion causes randomly arranged articles on the conveyor to undergo a mixing motion that enables them to squeeze into spaces between other articles created by the progressive velocity increase of the rollers in the downstream direction of the conveyor to form a single file line of articles.

It should be noted that the drive velocities selected do not have to be such that the opposed lateral forces are exactly equal in order to create the desired effect. The intensity of the mixing motion is dependent on the relationship of the skew angles "α" and "β", the relationship of the roller drive velocities, the co-efficients of friction, (static and dynamic) and the mass and velocity of the articles as they pass over the conveyor.

It should also be noted that an elongate narrow article will align itself with the longitudinal axis of the neutral zone as it is conveyed downstream. This is due to the fact that the forces of the rollers produce a force moment along the entire length of the article and in response the article will assume a neutral position at which these forces are in equilibrium. The neutral position for elongated articles is one in which the long axis of the article is aligned with the longitudinal axis of the neutral zone.

Figure 11:
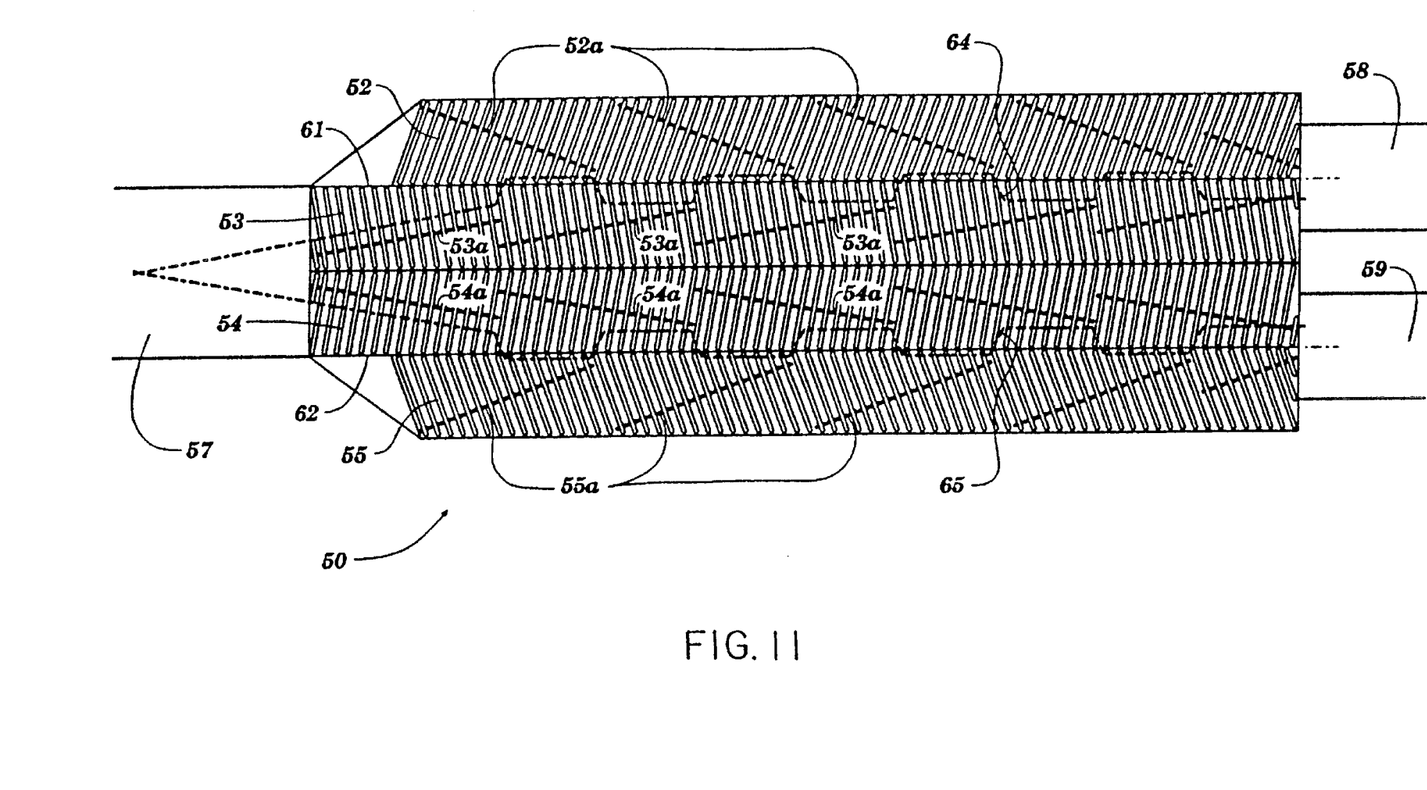
FIG. 11 is a plan view of a combined flow splitter unscrambler conveyor according to a further alternate embodiment of the invention.

FIG. 11 shows an alternate embodiment of the invention in which two flow splitters are placed side by side in order to create a combined flow splitter-unscrambler conveyor 50. The conveyor comprises four sets of elongated rollers 52–55 which are positioned at alternate angles to form two side-by-side herringbone patterns. The roller sets 53 and 54 are coupled at their upstream end to an input conveyor 57, the roller sets 52 and 53 are coupled at their downstream end to an output conveyor 58, and the roller sets 54 and 55 are coupled at their downstream end to an output conveyor 59. Articles entering the conveyor 50 from the input conveyor 57 are driven by the diverging rollers of sets 53 and 54 to the two axes 61 and 62 at the intersection of roller sets 52 and 53, and 54 and 55, respectively. The roller sets 52 and 53 form a herringbone pattern of rollers similar to the conveyor of FIG. 5 and are driven by belts 52a and 53a to form successive zones of increasing speeds. The rollers of sets 52 and 53 are positioned at differing angles to the axis 61 and due to the staggered locations of the belts 52a and 53a, a neutral zone axis 64 will be formed which is similar to the neutral zone axis 46 in the conveyor of FIG. 5. In a similar manner, the rollers of sets 54 and 55 are positioned at differing angles to the axis 62 between them and are driven by belts 54a and 55a to form zones of increasing speeds. Due to the staggered locations of the belts 54a and 55a, a neutral zone axis 65 will be formed which is similar to the neutral zone axis 46 in the conveyor of FIG. 5. As a result, a mass of articles delivered to the conveyor 50 by the input conveyor 57 will tend to divide and each of the articles will be driven to one of the two axes 61 and 62. The increasing speeds of the zones along the two axes 61 and 62 and the staggered arrangements of the drive belts will cause the articles to form two single file lines of articles, to rotate or twist around their own axis, and to follow the neutral axes 64 and 65 as they proceed to the two output conveyors 58 and 59. In this way, the conveyor 50 will both singulate and split a mass of articles into two separate lines of articles.

Having thus described the invention various alterations and modifications will occur to those skilled in the art, which modifications and alterations are intended to be within the scope of the invention as defined in the appended claims.

I claim:

1. A combined flow splitter and unscrambling conveyor having one input and two outputs, the conveyor comprising:

a first and second set of rollers forming a herringbone pattern and having a first output conveyor coupled to the downstream end;

a third and fourth set of rollers forming a herringbone pattern and having a second output conveyor coupled to the downstream end;

an input conveyor coupled to the second and third set of rollers at the upstream end;

means for applying diverging lateral forces to articles delivered at the upstream end of the second and third set of rollers;

means for applying converging lateral forces to articles on the first and second sets of rollers and on the third and fourth sets of rollers; whereby articles enter the conveyor in a scrambled mass at the upstream end of the second and third sets of rollers and exit the conveyor in two lines at the downstream end of the first end second sets of rollers and the third and fourth sets of rollers.

2. The combined flow splitter and unscrambling conveyor of claim 1 further comprising:

means for applying unequal axial forces to articles on the first and second set of rollers and on the third and fourth sets of rollers causing the articles to twist as they are conveyed downstream.

3. The combined flow splitter and unscrambling conveyor of claim 2 further comprising:

a plurality of zones of rollers comprising each of the first, second, third and fourth sets of rollers;

separate drive means for each of the zones of rollers, each of the drive means driving the sets of rollers at progressively increasing speeds in the downstream direction of the conveyor.

4. The combined flow splitter and unscrambling conveyor of claim 3 wherein the zones of the first and second sets of rollers are staggered with respect to one another on either side of an axis which separates the first and second sets of rollers and wherein the zones of the third and fourth sets of rollers are staggered with respect to one another on either side of an axis which separates the third and fourth sets of rollers.

5. An unscrambling conveyor for processing a randomly arranged mass of articles delivered at the input of the conveyor into a single-file line of articles, the unscrambling conveyor comprising:

an axis extending in the longitudinal direction of the conveyor and separating the conveyor into two halves;

means for separating each half of the conveyor into a plurality of successive zones of progressively increasing speeds, wherein the zones on one side of the axis are staggered with respect to the zones on the other side.

6. The unscrambling conveyor of claim 5 further comprising:

means for generating lateral and axial forces in each of the zones, wherein the axial forces convey an article in the downstream direction of the conveyor and the lateral forces convey an article alternately on and off of the axis.

7. A combined flow splitter and unscrambling conveyor mechanism having one input and two outputs, the conveyor comprising:

a first and second set of rollers forming a herringbone pattern and having a first output conveyor at the downstream end;

a third and fourth set of rollers forming a herringbone pattern and having a second output conveyor at the downstream end;

an input conveyor at the upstream end of the four sets of rollers; and means for applying diverging lateral forces to articles delivered at the upstream end of the second and third set of rollers;

whereby articles enter the conveyor mechanism in one mass at the upstream end of the conveyor and exit the conveyor mechanism in two lines on the first and second output conveyors.

8. The combined flow splitting and unscrambling conveyor mechanism of claim 7 further comprising;

first means for applying converging lateral forces to articles on the first and second sets of rollers and second means for applying converging lateral forces on the third and fourth sets of rollers.

9. The combined flow splitter and unscrambling conveyor mechanism of claim 8 further comprising:

first means for applying unequal axial forces to articles on the first and second set of rollers and second means for applying unequal axial forces to articles on the third and fourth sets of rollers causing the articles to twist as they are conveyed downstream.

10. The combined flow splitter and unscrambling conveyor mechanism of claim 9 further comprising:

a plurality of zones of rollers comprising each of the first, second, third, and fourth sets of rollers;

separate drive means for each of the zones of rollers, each of the drive means driving the sets of rollers at progressively increasing speeds in the downstream direction of the conveyor.

11. The combined flow splitter and unscrambling conveyor mechanism of claim 10 wherein the zones of the first and second sets of rollers are staggered with respect to one another on either side of a center axis which separates the first and second sets of rollers and wherein the zones of the third and fourth sets of rollers are staggered with respect to one another on either side of a center axis which separates the third and fourth sets of rollers.

12. The combined flow splitter and unscrambling conveyor mechanism of claim 11 wherein the staggered zones of the first and second sets of rollers cause unequal converging lateral forces on articles on the first and second sets of rollers and the staggered zones of the third and fourth sets of rollers cause unequal converging lateral forces on articles on the third and fourth sets of rollers.

13. The combined flow splitter and unscrambling conveyor mechanism of claim 12 wherein the unequal converging lateral forces on the first and second sets of rollers and on the third and fourth sets of rollers convey an article on and off the center axis separating the first and second sets of rollers and the third and fourth sets of rollers.

* * * * *